United States Patent [19]

Iwabuchi et al.

[11] Patent Number: 5,047,854
[45] Date of Patent: Sep. 10, 1991

[54] IMAGE INFORMATION TRANSMISSION SYSTEM TRANSMITTING MAXIMUM AND MINIMUM VALUE DATA

[75] Inventors: Yoshitsugu Iwabuchi, Atsugi; Hisashi Ishikawa, Sagamihara, both of Japan

[73] Assignee: Canon Kabushiki Kaisha, Tokyo, Japan

[21] Appl. No.: 386,105

[22] Filed: Jul. 28, 1989

[51] Int. Cl.⁵ .............................................. H04N 7/12
[52] U.S. Cl. ..................................... 358/135; 358/136
[58] Field of Search ............... 358/105, 135, 136, 133; 341/200

[56] References Cited

U.S. PATENT DOCUMENTS

| 4,722,003 | 1/1989 | Kondo | 358/135 |
| 4,802,005 | 1/1989 | Kondo | 358/136 X |
| 4,845,560 | 7/1989 | Kondo et al. | 358/136 X |

*Primary Examiner*—Victor R. Kostak
*Attorney, Agent, or Firm*—Fitzpatrick, Cella, Harper & Scinto

[57] ABSTRACT

An image information transmission system that transmits image information, one frame of which is constituted by a plurality of image data. The plurality of pixel data corresponding to the one-frame image information is divided into a plurality of pixel blocks using a predetermined number of pixel data as a unit pixel block. Maximum and minimum values of pixel data within each pixel block are detected in units of divided pixel blocks. Maximum value data representing the detected maximum value and minimum value data representing a detected minimum value are output. One of the different quantization characteristics is selected in accordance with a difference between the maximum and minimum values of each pixel blocks output as described above. A level region between the maximum and minimum values is quantized to obtain a plurality of regions on the basis of the selected quantization characteristic. Position data representing one of the plurality of regions to which the pixel data within the pixel block belongs is output.

The maximum and minimum value data output in units of pixel blocks and the position data output in correspondence with the pixel data within each pixel block are transmitted as described above, and therefore, a high-quality image information signal can be transmitted regardless of the characteristics of images.

9 Claims, 5 Drawing Sheets

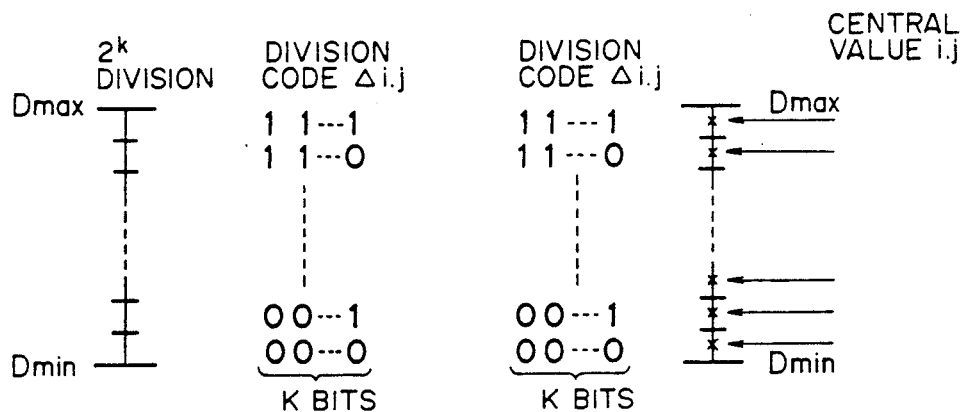
FIG.4(a) PRIOR ART  FIG.4(b) PRIOR ART
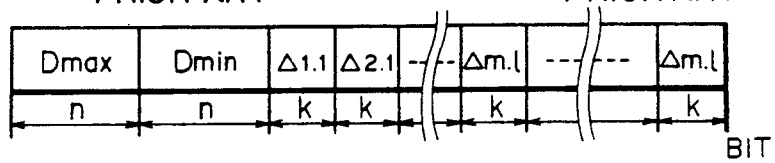
FIG. 5 PRIOR ART
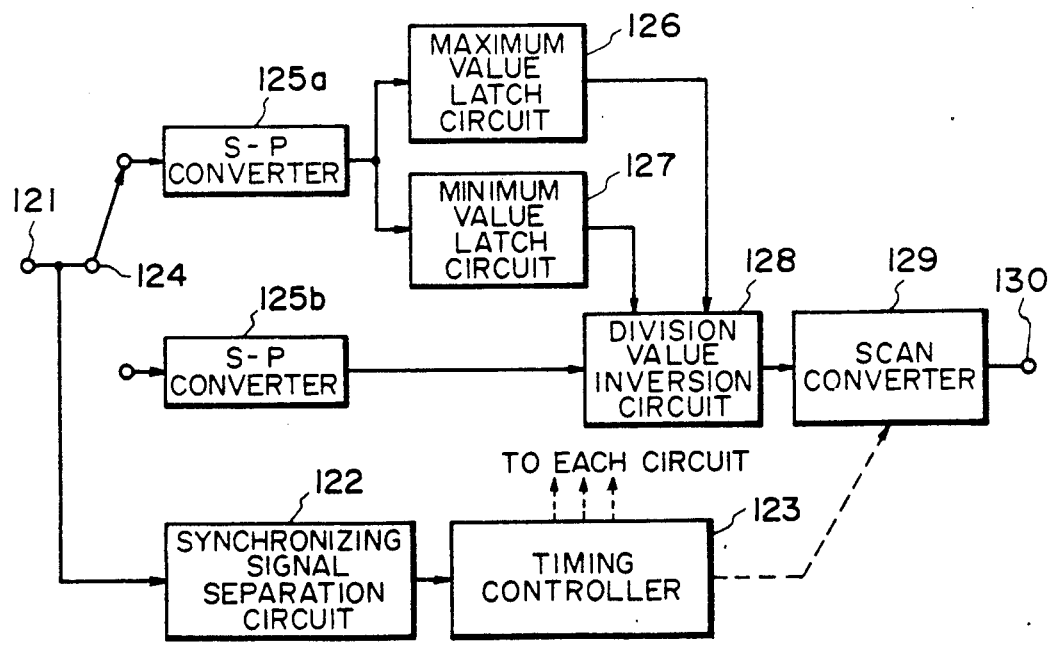
FIG. 6 PRIOR ART

IMAGE INFORMATION TRANSMISSION SYSTEM TRANSMITTING MAXIMUM AND MINIMUM VALUE DATA

BACKGROUND OF THE INVENTION

1. Field of the Invention

The present invention relates to an image information transmission system for transmitting image information.

2. Related Background Art

A MIN-MAX method is available as a conventional method of encoding a television signal and reducing the average number of bits per sample in order to obtain a narrow transmission band of the encoded television signal.

The MIN-MAX method will be described below.

A television signal has high two- or three-dimensional correlation. When pixels of an image representing the television signal are divided into small blocks, a pixel level of each block often has only a narrow dynamic range due to local correlation. When a dynamic range of the pixel level in each block is obtained and adaptive coding is performed, the television signal can be compressed with high efficiency.

The MIN-MAX method will be described in more detail with reference to the accompanying drawings.

FIG. 1 is a block diagram showing a schematic arrangement of a data transmission side in a conventional image information transmission system. A raster-scanned analog image signal such as a television signal is sampled at a predetermined frequency, and n-bit digital image data is input to a terminal 101. This $2^n$ gray-level digital image data is supplied to a pixel block division circuit 102. FIG. 2 is a view showing a state wherein all pixel data of one frame are divided into pixel blocks. In the pixel block division circuit 102, as shown in FIG. 2, all pixel data of one frame are divided into a plurality of pixel blocks such that the number of pixels of each pixel block in the horizontal direction (to be referred to as an H direction hereinafter) is l, and the number of pixels of each pixel block in a vertical direction (to be referred to as a V direction hereinafter) is m. That is, each pixel block consists of (l×m) pixels. The pixel block division circuit 102 outputs pixel data in units of pixel blocks.

FIG. 3 is a view showing a structure of each pixel block. The pixel block consists of $D_{1,1}$ to $D_{m,l}$ pixel data. The pixel data output in units of pixel blocks from the pixel block division circuit 102 is input to a maximum value detection circuit 103, a minimum value detection circuit 104, and a timing adjusting circuit 105. Of all the pixel data $D_{1,1}$ to $D_{m,l}$, pixel data representing a maximum value ($D_{max}$) and a minimum value ($D_{min}$) are detected by and output from the detection circuits 103 and 104, respectively.

The timing adjusting circuit 105 delays all the pixel data by a time period required for causing the maximum and minimum value detection circuits 103 and 104 to detect the maximum and minimum values $D_{max}$ and $D_{min}$. The pixel data are supplied to a division value conversion circuit 106 in a predetermined order in units of pixel blocks, e.g., in an order of $D_{1,1}, D_{2,1}, D_{3,1}, \ldots D_{m,1}, D_{1,2}, \ldots D_{m,2}, \ldots D_{1,(l-1)}, \ldots D_{m,(l-1)}, D_{1,l}, \ldots D_{m,l}$.

All the pixel data $D_{1,1}$ to $D_{m,l}$ and the maximum and minimum values $D_{max}$ and $D_{min}$ of each pixel block are input to the division value conversion circuit 106. A difference between the maximum and the minimum values $D_{max}$ and $D_{min}$ of each pixel data is divided into $2^k$ (where k is an integer smaller than n) regions, and quantization levels of these regions are represented by k-bit division codes $\Delta_{1,1}$ to $\Delta_{m,l}$ to detect a correspondence between each pixel data and a corresponding region. In place of each pixel data, a division code representing the corresponding region to which the pixel data corresponds is output. The quantization state is shown in FIG. 4(a).

shown in FIG. 4(a), $\Delta_{i,j}$ is output as a k-bit binary code. The resultant k-bit division code $\Delta_{i,j}$ and n-bit maximum and minimum values $D_{max}$ and $D_{min}$ are converted into serial data by parallel-to-serial (P-S) converters 107a, 107b, and 107c, respectively. The serial data is converted into serial data (FIG. 5) by a data selector 108. FIG. 5 shows transmission data for one pixel block.

The time base of data output from the data selector 108 is controlled by a first-in first-out (FIFO) memory 109 so as to obtain a constant data transfer rate. A synchronizing signal is added to an output from the FIFO memory 109 by a synchronizing signal addition circuit 110. The resultant signal is output from an output terminal 111 onto a transmission line (e.g., a magnetic recording/reproducing system such as a VTR). The synchronizing signal can be added to the output from the FIFO memory 109 for every pixel block or every plurality of pixel blocks. Timing of the respective circuit components are determined on the basis of timing signals output from a timing controller 112.

FIG. 6 is a block diagram showing a schematic arrangement of a data reception side corresponding to the data transmission side shown in FIG. 1. Referring to FIG. 6, transmission data encoded by the MIN-MAX method at the transmission side is input to a terminal 121. The synchronizing signal included in the input transmission data is separated by a synchronizing signal separation circuit 122 and is supplied to a timing controller 123. The timing controller 123 generates various timing signals for controlling operation timings of the respective circuit components on the reception side on the basis of the synchronizing signal supplied to the timing controller 123.

A data selector 124 divides the input transmission data into n-bit maximum and minimum value data $D_{max}$ and $D_{min}$ and the k-bit quantized codes $\Delta_{i,j}$ obtained by k-bit quantizing the pixel data between the maximum and minimum values $D_{max}$ and $D_{min}$. The data $D_{max}$ and $D_{min}$ and the code $\Delta_{i,j}$ are converted into parallel data by serial-to-parallel (S-P) converters 125a and 125b, respectively. The maximum and minimum value data $D_{max}$ and $D_{min}$ of each pixel as parallel data from the S-P converter 125a are latched by latch circuits 126 and 127, respectively. The codes $\Delta_{i,j}$ are converted into all pixel data $D_{1,1}$ to $D_{m,l}$ within each block by a division value inversion circuit 128 on the basis of the data $D_{max}$ and $D_{min}$ latched by the latch circuits 126 and 127. The pixel data are then input to a scan converter 129. The scan converter 129 outputs image data from a terminal 130 in response to a timing signal generated by the timing controller 123.

In the conventional image transmission system, quantization of a difference between a pair of data associated with the maximum and minimum values is predetermined regardless of the characteristics of an image in each block. That is, a technique for quantizing a pixel block including a portion (edge portion) in which image data between the adjacent pixels greatly change is equal to a technique for quantizing a pixel block representing a portion (flat portion) in which image data between the adjacent pixels do not greatly change. Therefore, the quantization techniques may not be suitable for the characteristics of the image data, and pixel blocks for which the quantization techniques are not suitable are typically subjected to an increase in quantization noise.

SUMMARY OF THE INVENTION

It is an object of the present invention to provide an image information transmission system capable of solving the conventional problems described above.

It is another object of the present invention to provide a method of transmitting high-quality image information regardless of differences in characteristics of images.

In order to achieve this object according to an aspect of the present invention, there is provided a method of transmitting image information, one frame of which is constituted by a plurality of pixel data, comprising:

the first step of dividing the plurality of pixel data corresponding to the one-frame image information into a plurality of pixel blocks each having a predetermined number of pixel data as a unit pixel block;

the second step of detecting maximum and minimum values represented by pixel data within each pixel block in units of pixel blocks divided in the first step, and outputting maximum value data representing the detected maximum value and minimum value data representing the detected minimum value;

the third step of selecting one of a plurality of different quantization characteristics in accordance with a difference between the maximum and minimum values of each pixel block detected in the second step, quantizing a level region between the maximum and minimum values to obtain a plurality of regions on the basis of the selected quantization characteristic, and outputting position data representing a correspondence between each pixel data within each pixel block and one of the plurality of divided regions in correspondence with the pixel data within each pixel block; and the fourth step of transmitting as unit block data the maximum and minimum value data output in units of pixel blocks in the second step and the position data output in correspondence with the pixel data within each pixel block in the third step.

It is still another object of the present invention to provide an image information transmission apparatus capable of transmitting high-quality image information regardless of differences in characteristics of images.

In order to achieve this object according to another aspect of the present invention, there is provided an image information transmission apparatus for transmitting image information, one frame of which is constituted by a plurality of pixel data, comprising:

dividing means for dividing the plurality of pixel data corresponding to the one-frame image information into a plurality of pixel blocks each having a predetermined number of pixel data as a unit pixel block;

maximum and minimum value detecting means for detecting maximum and minimum values represented by pixel data within each pixel block in units of pixel blocks divided by the dividing means, and outputting maximum value data representing the detected maximum value and minimum value data representing the detected minimum value;

position data generating means for selecting one of a plurality of different quantization characteristics in accordance with a difference between the maximum and minimum values of each pixel block detected in the second step, quantizing a level region between the maximum and minimum values to obtain a plurality of regions on the basis of the selected quantization characteristic, and outputting position data representing a correspondence between each pixel data within each pixel block and one of the plurality of divided regions in correspondence with the pixel data within each pixel block supplied from the dividing means; and sending means for transmitting as unit block data the maximum and minimum value data output in units of pixel blocks from the maximum and minimum value detecting means and the position data output in correspondence with the pixel data within each pixel block from the position data generating means.

The above and other objects, advantages, and features of the present invention will be apparent from the detailed description of a preferred embodiment in conjunction with the accompanying drawings.

BRIEF DESCRIPTION OF THE DRAWINGS

FIG. 4(a) is a view showing conversion characteristics of a division value conversion circuit in FIG. 1;

FIG. 4(b) is a view showing inversion characteristics of a division value inversion circuit shown in FIG. 6;

FIG. 5 is a view showing a structure of transmission data corresponding to one pixel block;

FIG. 6 is a block diagram showing a schematic arrangement of a data reception side corresponding to the data transmission side shown in FIG. 1;

BRIEF DESCRIPTION OF THE PREFERRED EMBODIMENT

The present invention will be described with reference to an embodiment.

Figure 1:
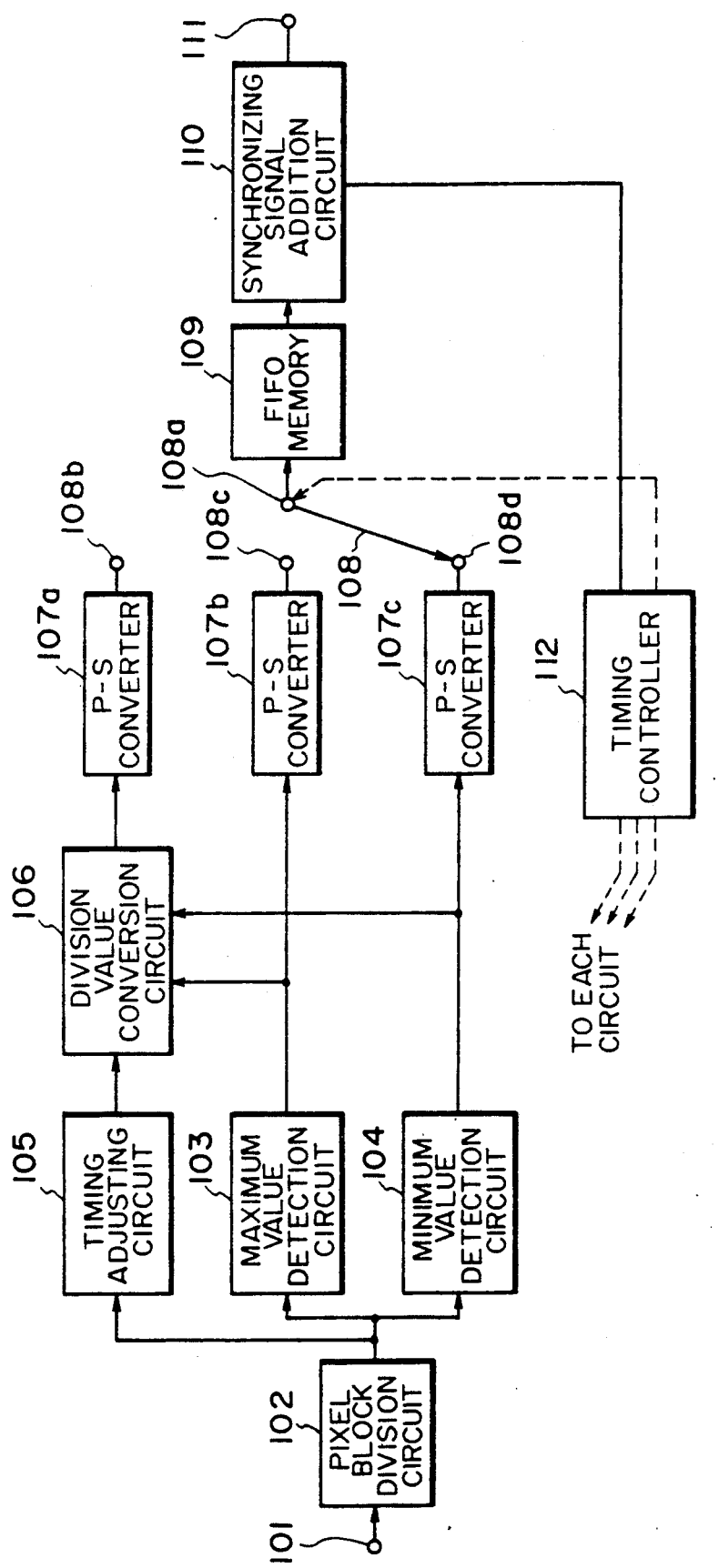
FIG. 1 is a block diagram showing a schematic arrangement of a data transmission side in a conventional image information transmission system.
Figure 2:
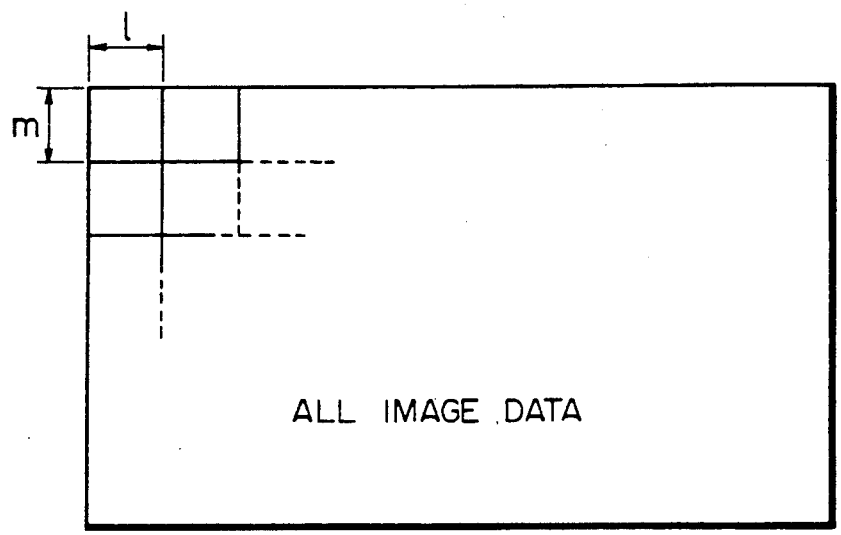
FIG. 2 is a view showing a state wherein one-frame all pixel data are divided into pixel blocks.
Figure 3:
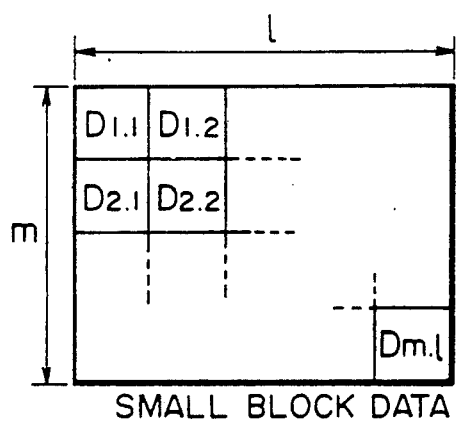
FIG. 3 is a view showing a structure of each pixel block.
Figure 7:
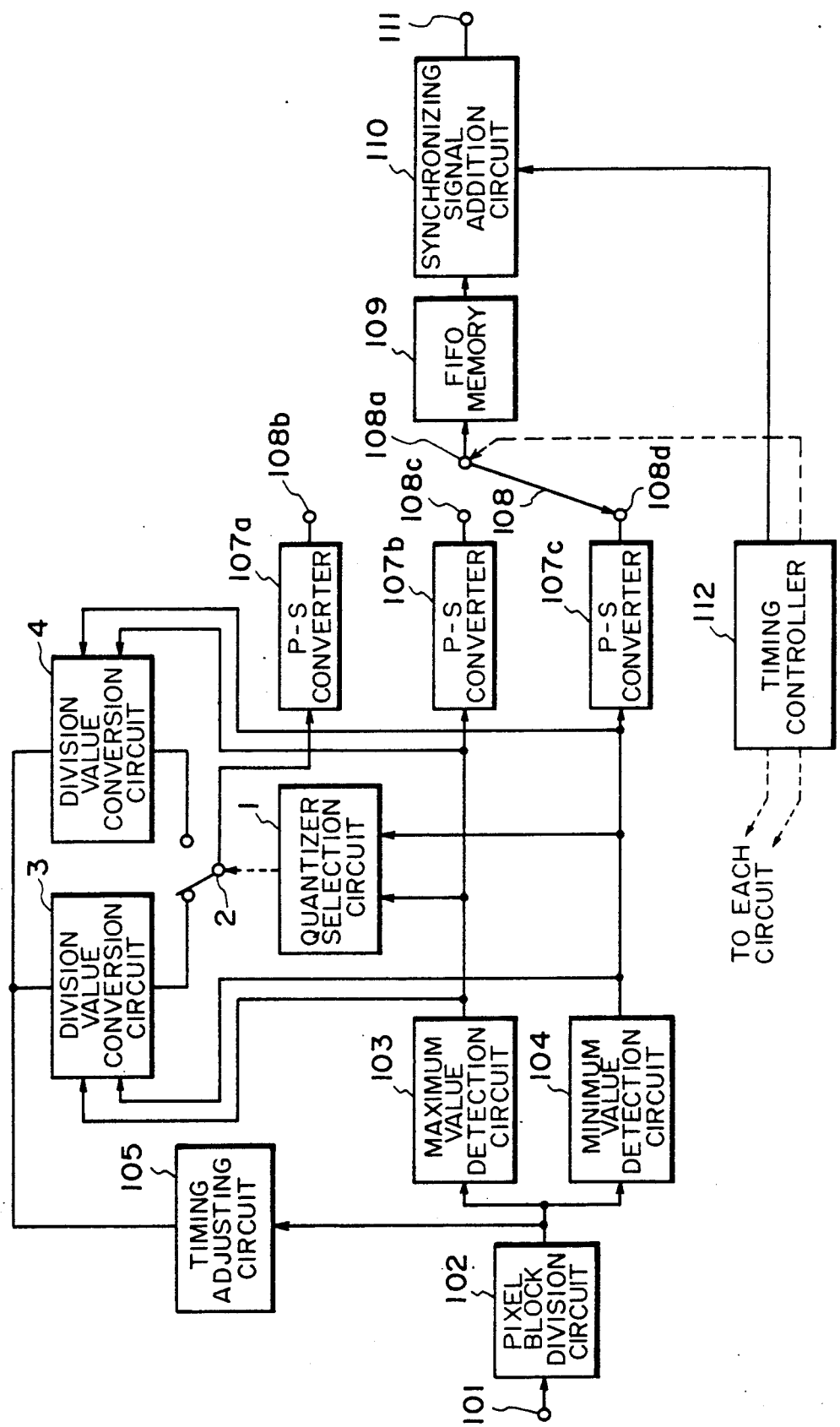
FIG. 7 is a block diagram showing a schematic arrangement of a data transmission side of an image information transmission system according to an embodiment of the present invention.

FIG. 7 is a block diagram showing a schematic arrangement of an image information transmission system according to an embodiment of the present invention. The same reference numerals as in FIGS. 1 to 5 in the prior art denote the same or corresponding parts in FIG. 7. Only circuit components denoted by numerals different from those in FIGS. 1 to 5 will be described below. A quantizer selection circuit 1 detects a difference between maximum and minimum values within each pixel block to discriminate a state of an image, and selects a quantizer suitable for the detected value. A switch 2 switches a quantizer to be used. Division value conversion circuits 3 and 4 have quantizers with different quantization characteristics.

Image digital data input from a terminal 101 in FIG. 7 is divided into pixel blocks by a pixel block division circuit 102. Maximum and minimum values $D_{max}$ and $D_{min}$ of each pixel block are detected by maximum and minimum value detection circuits 103 and 104, respectively. The quantizer selection circuit 1 detects a difference ($D_{max}-D_{min}$) between the maximum and minimum values $D_{max}$ and $D_{min}$. When this difference is large, there is a high possibility for an edge image portion to be present in the corresponding pixel block. However, when the difference is small, there is a high possibility for a flat image portion to be present in the corresponding pixel block. If th $\leq (D_{max}-D_{min})$ (where th is a threshold value), the division value conversion circuit 3 having a quantizer for performing quantization suitable for an image including an edge portion is selected. However, if th $> (D_{max}-D_{min})$, then the division value conversion circuit 4 having the quantizer suitable for the image including the flat portion is selected.

Figure 8:
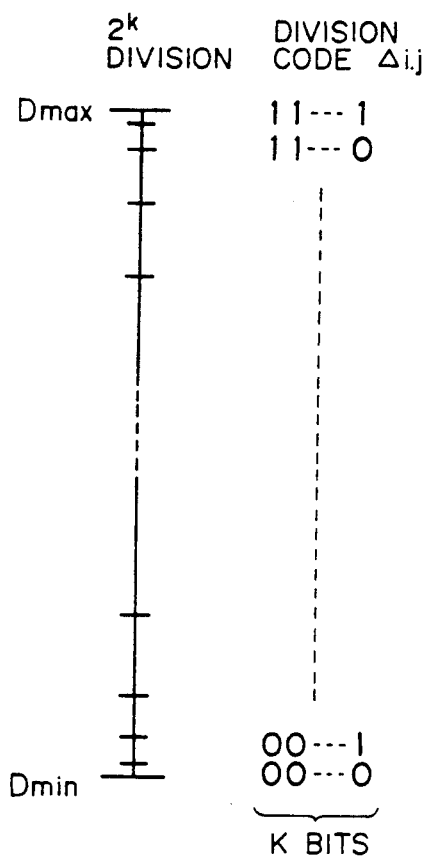
FIG. 8 is a view showing quantization applied to an image including an edge portion.
Figure 9:
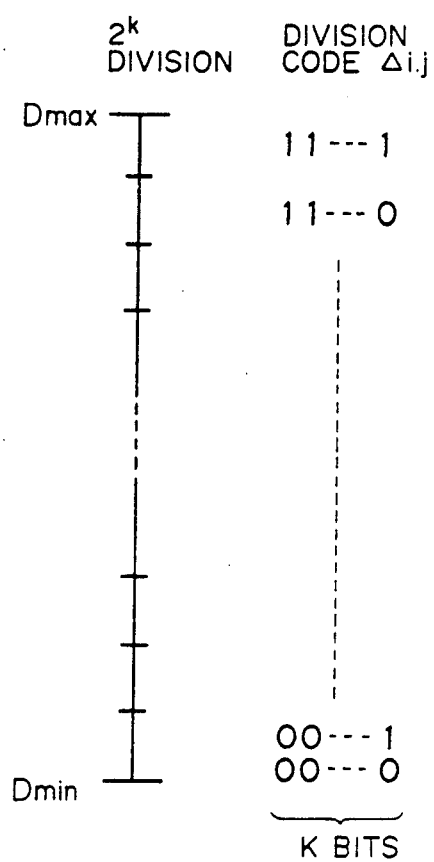
FIG. 9 is a view showing quantization applied to an image including a flat portion.

FIG. 8 shows quantization suitable for an image including an edge portion, and FIG. 9 shows quantization suitable for an image including a flat portion. Quantization levels of $2^k$ regions obtained by dividing a difference between the maximum and minimum values $D_{max}$ and $D_{min}$ by $2^k$ are represented by $\Delta_{i,j}$, each having K bits, as shown in FIGS. 8 and 9. A correspondence between each pixel data and a corresponding one of the $2^k$ regions is detected. In place of the pixel data, a division code representing the area to which the pixel data belongs is output. The quantization characteristics of the quantizers are different from each other. FIG. 8 shows nonlinear quantization characteristics, and FIG. 9 shows linear quantization characteristics. These quantizers are used in the division value conversion circuits 3 and 4, respectively.

In this embodiment, ($D_{max}-D_{min}$) values corresponding to the edge or flat portion present within the pixel block are statistically obtained and defined as the threshold value.

The two quantizers are used in the above embodiment. However, the number of quantizers is not limited to two but can be three or more.

According to the present invention, as has been described above, the quantization characteristics are adaptively changed for the pixel blocks, and quantization noise based on differences in features of images of pixel blocks can be reduced.

What is claimed is:

1. A method of transmitting image information, one frame of which is constituted by a plurality of pixel data, comprising:
   (A) a first step of dividing the plurality of pixel data corresponding to the one-frame image information into a plurality of pixel blocks each having a predetermined number of pixel data as a unit pixel block;
   (B) a second step of detecting maximum and minimum values represented by pixel data within each pixel block in units of pixel blocks divided in the first step, and outputting maximum value data representing the detected maximum value and minimum value data representing the detected minimum value;
   (C) a third step of selecting one of a plurality of different quantization characteristics which have the same quantization bit number and different characteristics, in accordance with a difference between the maximum and minimum values of each pixel block detected in the second step, quantizing a level region between the maximum and minimum values to obtain a plurality of regions on the basis of the selected quantization characteristic, and outputting position data representing a correspondence between each pixel data within each pixel block and one of the plurality of divided regions in correspondence with the pixel data within each pixel block; and
   (D) a fourth step of transmitting as unit block data the maximum and minimum value data output in units of pixel blocks in the second step and the position data output in correspondence with the pixel data within each pixel block in the third step.

2. A method according to claim 1, wherein the number of bits of the position data is smaller than that of the pixel data.

3. A method according to claim 1, wherein the fourth step further includes;
   (A) a fifth step of temporarily storing the maximum and minimum value data output in units of pixel blocks in the second step and the position data output in correspondence with the pixel data within each pixel block in the third step; and
   (B) a sixth step of outputting the data temporarily stored in the fifth step at a predetermined rate.

4. A method of transmitting image information, one frame of which is constituted by a plurality of pixel data, comprising:
   (A) a first step of dividing a plurality of pixel data corresponding to the one-frame image information into a plurality of pixel blocks each having a predetermined number of pixel data as a unit pixel block;
   (B) a second step of detecting maximum and minimum values represented by pixel data within each pixel block in units of pixel blocks divided in the first step, and outputting maximum value data representing the detected maximum value and minimum value data representing the detected minimum value;
   (C) a third step of linearly quantizing a level region between the minimum and maximum values of the pixel block detected in the second step, dividing the level region into the plurality of regions, and generating position data representing one of the plurality of divided regions to which the pixel data within the pixel block belongs in correspondence with the pixel data within each pixel block;
   (D) a fourth step of nonlinearly quantizing the level region between the minimum and maximum values of the pixel block detected in the second step, dividing the level region into the plurality of regions, and generating position data representing one of the plurality of divided regions to which the pixel data within the pixel block belongs in correspondence with the pixel data within each pixel block; and
   (E) a fifth step of calculating a difference between the maximum and minimum values of each pixel block detected in the second step, comparing the difference wit a predetermined threshold value, outputting the position data generated in the third step when the difference is smaller than the threshold value, and outputting the position data generated in the fourth step when the difference is equal to or larger than the threshold value;
   (F) a sixth step of transmitting as unit block data the maximum and minimum value data output in units of pixel blocks in the second step and the position data output in correspondence with the pixel data within each pixel block in the fifth step.

5. An image information transmission apparatus for transmitting image information, one frame of which is constituted by a plurality of pixel data, comprising:
- (A) dividing means for dividing the plurality of pixel data corresponding to the one-frame image information into a plurality of pixel blocks each having a predetermined number of pixel data as a unit pixel block;
- (B) maximum and minimum value detecting means for detecting maximum and minimum values represented by pixel data within each pixel block in units of pixel blocks divided by said dividing means, and outputting maximum value data representing the detected maximum value and minimum value data representing the detected minimum value;
- (C) position data generating means for selecting one of a plurality of different quantization characteristics which have the same quantization bit number and different characteristics, in accordance with a difference between the maximum and minimum values of each pixel block detected in said maximum and minimum value detecting means, quantizing a level region between the maximum and minimum values to obtain a plurality of regions on the basis of the selected quantization characteristic, and outputting position data representing a correspondence between each pixel data within each pixel block and one of the plurality of divided regions in correspondence with the pixel data within each pixel block supplied from said dividing means; and
- (D) sending means for transmitting as unit block data the maximum and minimum value data output in units of pixel blocks from said maximum and minimum value detecting means and the position data output in correspondence with the pixel data within each pixel block from said position data generating means.

6. An apparatus according to claim 5, wherein said maximum and minimum value detecting means includes:
- (A) a maximum value detector for detecting a maximum value represented by pixel data within each pixel block in units of pixel blocks divided by said dividing means; and
- (B) a minimum value detector for detecting a minimum value represented by pixel data within each pixel block in units of pixel blocks divided by said dividing means.

7. An apparatus according to claim 5, wherein the number of bits of the position data is smaller than that of the pixel data.

8. An apparatus according to claim 5, wherein said sending means includes:
- (A) output means for sequentially outputting the maximum and minimum value data output in units of pixel blocks from said maximum and minimum value detecting means and the position data output in correspondence with the pixel data within each pixel block from said position data generating means; and
- (B) memory means for temporarily storing the data sequentially output from said output means and outputting the stored data at a predetermined rate.

9. An image information transmission apparatus for transmitting image information, one frame of which is constituted by a plurality of pixel data, comprising:
- (A) dividing means for dividing the plurality of pixel data corresponding to the one-frame image information into a plurality of pixel blocks each having a predetermined number of pixel data as a unit pixel block;
- (B) maximum and minimum value detecting means for detecting maximum and minimum values represented by pixel data within each pixel block in units of pixel blocks divided by said dividing means, and outputting maximum value data representing the detected maximum value and minimum value data representing the detected minimum value;
- (C) first position data generating means for linearly quantizing the level region between the minimum and maximum values of the pixel block detected in said maximum and minimum value detecting means, dividing the level region into the plurality of regions, and generating position data representing one of the plurality of divided regions to which the pixel data within the pixel block belongs in correspondence with the pixel data within each pixel block;
- (D) second position data generating means for nonlinearly quantizing the level region between the minimum and maximum values of the pixel block detected in said maximum and minimum value detecting means, dividing the level region into the plurality of regions, and generating position data representing one of the plurality of divided regions to which the pixel data within the pixel block belongs in correspondence with the pixel data within each pixel block;
- (E) output selecting means for calculating a difference between the maximum and minimum values of each pixel block detected by said maximum and minimum value detecting means, comparing the difference with a predetermined threshold value, outputting the position data generated by said first position data generating means when the difference is smaller than the threshold value, and outputting the position data generated by said second position data generating means when the difference is equal to or larger than the threshold value; and
- (F) sending means for transmitting as unit block data the maximum and a minimum value data output in units of pixel blocks from said maximum and minimum value detecting means and the position data output in correspondence with the pixel data within each pixel block from said position data output selecting means.

* * * * *

UNITED STATES PATENT AND TRADEMARK OFFICE
CERTIFICATE OF CORRECTION

PATENT NO. : 5,047,854
DATED : September 10, 1991
INVENTOR(S) : YOSHITSUGU IWABUCHI, ET AL.          Page 1 of 2

It is certified that error appears in the above-identified patent and that said Letters Patent is hereby corrected as shown below:

Title page,

BETWEEN [22] AND [51]

Insert:  -- [30] Foreign Application Priority Data

Sep. 7, 1988 [JP]  Japan ..... 63-222464 --.

Title page

IN [56] REFERENCES CITED

U.S. PATENT DOCUMENTS, "4,722,003  1/1989  Kondo" should read  --4,722,003  1/1988  Kondo--.

IN [57] ABSTRACT

Line 14, "blocks" should read --block--.

COLUMN 2

Line 9, "shown" should read --As shown--.
Line 14, "into serial data" should read --into transmission data--.

UNITED STATES PATENT AND TRADEMARK OFFICE
CERTIFICATE OF CORRECTION

PATENT NO. : 5,047,854

DATED : September 10, 1991

INVENTOR(S) : YOSHITSUGU IWABUCHI, ET AL.

It is certified that error appears in the above-identified patent and that said Letters Patent is hereby corrected as shown below:

COLUMN 6

Line 54, "and" should be deleted.
   Line 58, "wit" should read --with--.
   Line 63, "value;" should read --value; and--.

Signed and Sealed this

First Day of June, 1993

Attest:

MICHAEL K. KIRK

Attesting Officer  Acting Commissioner of Patents and Trademarks